(12) United States Patent
Gollnick et al.

(10) Patent No.: US 11,424,606 B2
(45) Date of Patent: Aug. 23, 2022

(54) ELECTRICAL DEVICE ASSEMBLY AND SECURING MECHANISM

(71) Applicant: Biamp Systems, LLC, Beaverton, OR (US)

(72) Inventors: Charles D. Gollnick, Sherwood, OR (US); Joshua Beltran, Portland, OR (US); Mark Ureda, Santa Ana, CA (US); Rashid Skaf, Plano, TX (US); Joseph E. Andrulis, Irving, TX (US); Doug S. Wright, Coeur d'Alene, ID (US)

(73) Assignee: Biamp Systems, LLC, Beaverton, OR (US)

( * ) Notice: Subject to any disclaimer, the term of this patent is extended or adjusted under 35 U.S.C. 154(b) by 295 days.

(21) Appl. No.: 16/805,687

(22) Filed: Feb. 28, 2020

(65) Prior Publication Data

US 2020/0395746 A1    Dec. 17, 2020

Related U.S. Application Data

(60) Provisional application No. 62/861,535, filed on Jun. 14, 2019.

(51) Int. Cl.
*H02G 3/22* (2006.01)
*H02G 15/007* (2006.01)
*H02G 3/38* (2006.01)

(52) U.S. Cl.
CPC ............. *H02G 15/007* (2013.01); *H02G 3/22* (2013.01); *H02G 3/381* (2013.01)

(58) Field of Classification Search
CPC .......... H02G 15/007; H02G 3/22; H02G 3/08; H02G 3/081; H02G 15/00; H02G 3/24; H02G 3/26
USPC ..... 174/50, 53, 57, 58, 61, 63, 135; 220/3.2, 220/3.3, 4.02; 248/906, 343, 49, 68.1
See application file for complete search history.

(56) References Cited

U.S. PATENT DOCUMENTS

| | | | |
|---|---|---|---|
| 7,019,210 B2 * | 3/2006 | Radin | F21V 21/112 361/600 |
| 7,456,357 B1 * | 11/2008 | Kwong | B60R 21/235 174/58 |
| 7,586,039 B1 * | 9/2009 | Gretz | H02G 3/123 174/53 |
| 8,158,882 B1 * | 4/2012 | Gretz | H02G 3/20 174/40 R |
| 8,309,849 B2 * | 11/2012 | Dinh | H02G 3/045 220/3.9 |
| 8,704,089 B2 * | 4/2014 | Atchley | H02G 9/06 174/45 R |
| 9,027,208 B1 * | 5/2015 | Gretz | F16G 11/048 24/135 A |
| 9,065,264 B2 * | 6/2015 | Cooper | H02G 3/14 |
| 9,337,635 B2 * | 5/2016 | Korcz | H02G 3/08 |

* cited by examiner

*Primary Examiner* — Angel R Estrada

(57) ABSTRACT

Example embodiments provide a device that includes a housing with a surface with a cable pass-through hole, and a plate mounted against a surface of the housing, such that the plate includes a base which is affixed to the housing surface, and a protruding portion which extends vertically from the base, and the protruding portion has a support element which protrudes in a horizontal direction with respect to the base so a cable may rest against the protruding portion while being passed through the cable pass-through hole.

5 Claims, 2 Drawing Sheets

ELECTRICAL DEVICE ASSEMBLY AND SECURING MECHANISM

FIELD OF INVENTION

This application relates to a securing mechanism and more specifically to an electrical device assembly and securing mechanism.

BACKGROUND OF THE INVENTION

Certain electrical devices, which are hung from the ceiling, such as audio products (e.g., speakers, microphones, etc.) and other industry products associated with a conference room or similar type of working space, may require an expert installation due to safety and related integrity concerns. The weight of a hanging device may vary and over time, intermittent activities, such as air movement, vibrations, etc., can cause the original weight bearing components to lose their integrity, which could lead to failures, such as a device dropping to the floor, unpleasant appearances from wearing products among other types of undesirable results.

Certain products which contain a cable having only one strength member and two electrical conductors do not provide a safety backup in case the strength member or any of its connections should fail. Pendant-style loudspeakers are typically hung from a building's ceiling and hang over occupied spaces. If the strength member or its connections should fail, then the speaker will fall. Such speakers typically weight at least a few pounds and could seriously injure someone or could damage or destroy property positioned below the speaker at the time of such a failure. Such failures are caused by improper installation, by material corrosion, material fatigue, seismic events, building vibrations, structural fire or structural failure, etc. When speakers are installed using traditional approaches, a separate backup safety strength member must be added which adds extra cost and labor, and results in an unsightly installation.

SUMMARY OF THE INVENTION

The present application relates to a device that includes a housing with a surface with a cable pass-through hole, and a plate mounted against a surface of the housing, such that the plate includes a base which is affixed to the housing surface, and a protruding portion which extends vertically from the base, and the protruding portion has a support element which protrudes in a horizontal direction with respect to the base so a cable may rest against the protruding portion while being passed through the cable pass-through hole.

DETAILED DESCRIPTION

Example embodiments include housing configurations for a securing mechanism for a hanging electrical device.

Figure 1:
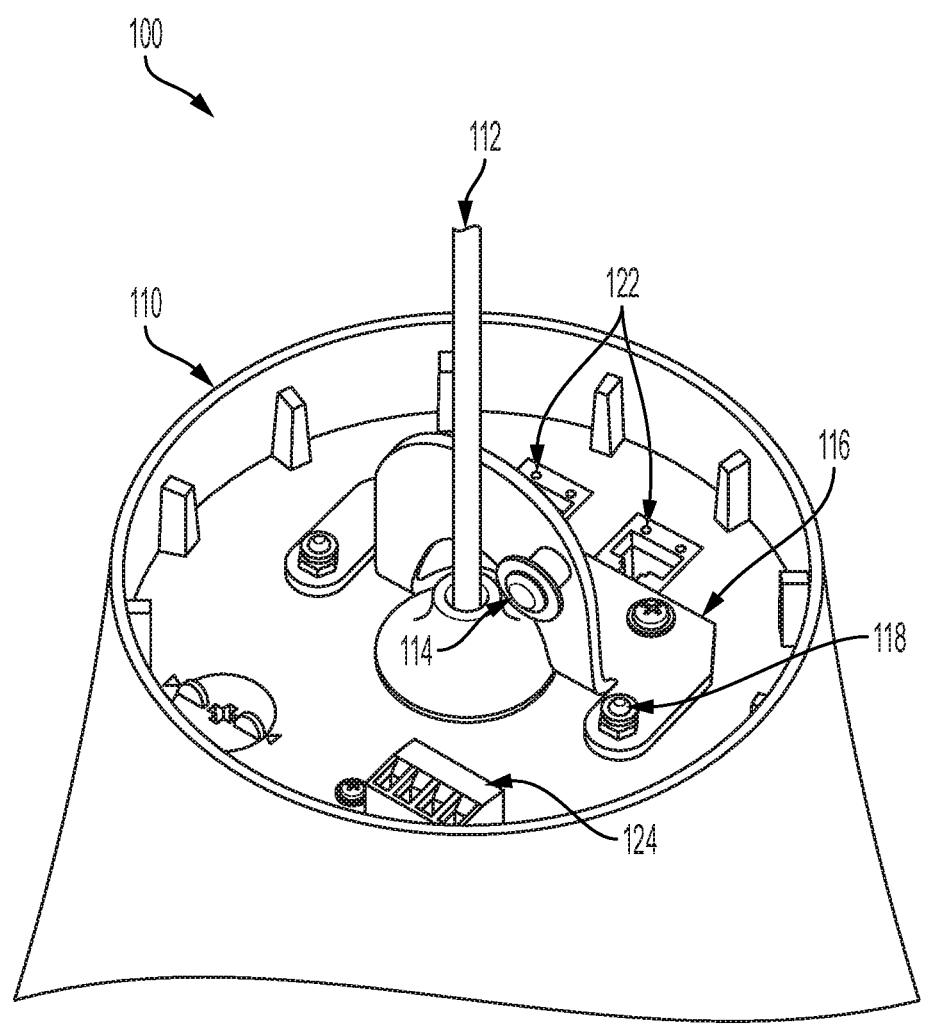
FIG. 1 illustrates a top portion of a device housing according to example embodiments.

FIG. 1 illustrates a top portion of a device housing according to example embodiments. Referring to FIG. 1, the configuration 100 provides a view of a top portion of a device housing 100, such as, in one example, a speaker housing that is exposed to permit access to certain conduits, such as a hanging conduit 112, which may be a cable that provides support and power via one or more support cables which are anchored under the plastic section where the pass-through hole permits the cable to be passed through and anchored on the reverse side. The top housing portion may also have one or more network cable inputs 122, which may provide direct access from a twisted-pair cable input 122 to a connected speaker or other device. In this configuration, the twisted-pair cables may be used as speaker wire to provide an audio signal to the speaker or a digital speaker controller which distributes the received digital signal to an analog speaker signal, which is output as sound from a speaker also included inside the housing 110. The support plate 116 may include a support 114, which may be a surface and/or bolt like element that includes a gap that is large enough to accommodate the cable 112 while including a washer that provides a securing surface so the cable does not slip off the support 114. The support plate 116 may include one or more support bolts 118 which hold the plate to the housing 110. The support may be located in an off-set position from the location of the cable hanging from a ceiling creating a 90 degree angle with respect to the support plate 116. However, the support plate may have an additional plate portion angled upward toward the cable at a 90 degree angle with respect to the plate 116, so the upward angled portion of the plate is parallel to the cable when the cable is in a hanging position.

The angled upward portion of the plate 116 has a support 114 as a protruding surface/bolt that permits the cable to be engaged against the support 114 to provide additional support and so the stress of the weight of the housing is not pressed solely against the cable-anchored portion of the housing. A wire set connector interface 124 may also provide an interface for a power source, controller source, etc.

Figure 2:
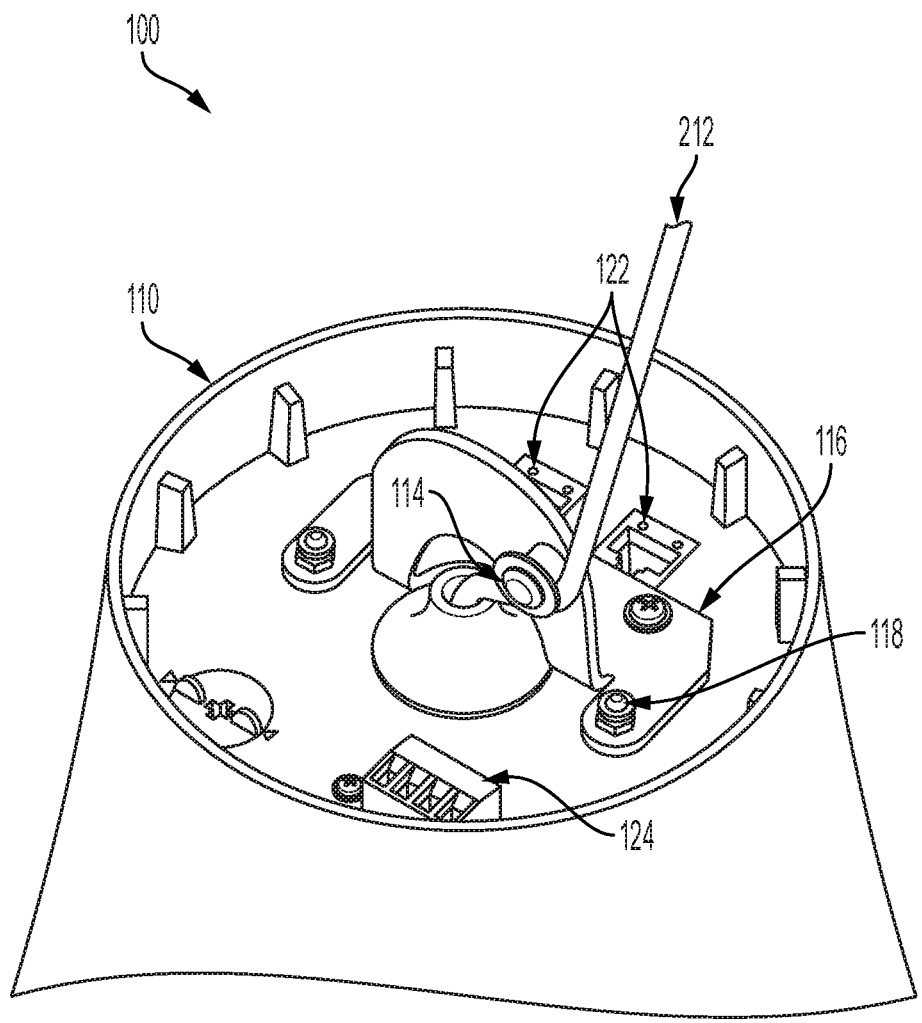
FIG. 2 illustrates a top portion of a device housing with an alternative cable position according to example embodiments.

FIG. 2 illustrates a top portion of a device housing with an alternative cable position according to example embodiments. In FIG. 2, the configuration 100 demonstrates the cable at an angled configuration 212 where the cable is wrapped against the support 114. This angled cable configuration provides additional support to the housing structure 110 by resting a portion of the cable against the support 114.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be configured with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., materials, shapes, sizes, etc.) thereto.

What is claimed is:

1. An apparatus comprising:
   a housing comprising a surface with a cable pass-through hole;
   a plate mounted against a surface of the housing, wherein the plate comprises
   a base which is affixed to the housing surface; and
   a protruding portion which extends vertically from the base, and wherein the protruding portion comprises a support element which protrudes in a horizontal direction with respect to the base and which protrudes perpendicular to the cable pass-through hole, and wherein the support element is off-set from a center position of the cable pass-through hole so a cable passing through the cable pass-through hole rests against the protruding portion off-set from the center portion of the cable pass-through hole to reduce tension on the cable.

2. The apparatus of claim 1, wherein the plate is mounted contiguous to the cable pass-through hole.

3. The apparatus of claim 1, wherein the plate and the housing are different materials.

4. The apparatus of claim 1, comprising
   one or more network cable interfaces flush mounted on the surface of the housing.

5. The apparatus of claim 1, wherein the housing is plastic and the base is metal.

* * * * *